United States Patent [19]

Riew

[11] 4,129,670

[45] Dec. 12, 1978

[54] REACTION PRODUCTS OF NON-CYCLOALIPHATIC EPOXY RESINS AND AMINE-TERMINATED LIQUID POLYMERS AND PROCESS FOR PREPARATION THEREOF

[75] Inventor: Changkiu K. Riew, Akron, Ohio

[73] Assignee: The B. F. Goodrich Company, Akron, Ohio

[21] Appl. No.: 824,761

[22] Filed: Aug. 15, 1977

Related U.S. Application Data

[60] Division of Ser. No. 595,445, Jul. 14, 1975, Pat. No. 4,055,541, which is a continuation-in-part of Ser. No. 586,723, Jun. 13, 1975, abandoned.

[51] Int. Cl.$^2$ .......................... B05D 1/28; B05D 7/02
[52] U.S. Cl. .................................. 427/386; 156/330; 260/18 PF; 260/31.8 E; 260/33.6 EP; 260/37 EP; 260/830 P; 260/836; 260/837 R; 260/837 PV; 428/261; 428/262; 528/113; 528/339; 528/341; 528/366

[58] Field of Search ................ 427/386; 260/830, 836, 260/837, 2 N, 47 EN, 18 PF, 78 SC

[56] References Cited

U.S. PATENT DOCUMENTS

| | | | |
|---|---|---|---|
| 3,375,299 | 3/1968 | Levine et al. | 260/830 P |
| 3,845,056 | 10/1974 | Robson | 260/268 R |

Primary Examiner—Theodore E. Pertilla
Attorney, Agent, or Firm—Charles A. Crehore

[57] ABSTRACT

Room-temperature-curable compositions can be prepared readily by mixing (A) 100 parts by weight of at least one non-cycloaliphatic epoxy resin and (B) from about 1 to about 1,000 parts by weight of at least one amine-terminated liquid polymer having a carbon-carbon backbone, (C) optionally, a chain extender or crosslinker and (D) optionally, a curing agent. The compositions are useful as castable elastomeric systems, as toughened structural plastics, as paints and coatings, as sealants and adhesives, and the like.

12 Claims, No Drawings

REACTION PRODUCTS OF NON-CYCLOALIPHATIC EPOXY RESINS AND AMINE-TERMINATED LIQUID POLYMERS AND PROCESS FOR PREPARATION THEREOF

CROSS REFERENCE TO RELATED APPLICATION

This is a division of my copending application Ser. No. 595,445 filed July 14, 1975, now U.S. Pat. No. 4,055,541, which in turn is a continuation-in-part of my copending application Ser. No. 586,723 filed June 13, 1975, now abandoned.

BACKGROUND OF THE INVENTION

Prior art teaches preparation of hydroxyl-terminated liquid polymers such as those described in U.S. Pat. Nos. 3,551,471 and 3,551,472, and carboxyl-terminated liquid polymers such as those described in U.S. Pat. No. 3,285,949. Such prior art polymers cure poorly with epoxy resins at room temperature and generally must be reacted at elevated temperatures in the presence of curing agents such as aliphatic or alicyclic amines. The carboxyl-terminated polymers form ester groups when they react with epoxy resins, and the reaction products are rather hydrolytically unstable. Moreover, use of larger amounts of carboxyl-terminated liquid polymers in epoxy resin compositions may require increasingly higher reaction temperatures, e.g., about 80°–180° C. when more than 50 parts carboxyl-terminated liquid polymer ($M_n$ 2000–5000) is used per 100 parts epoxy resin (epoxy equivalent wt. 160–200). New liquid polymer compositions are desired which are room-temperature curable, castable, hydrolytically stable and which generally do not require a catalyst or curing agent.

SUMMARY OF THE INVENTION

Room temperature curable compositions can be prepared readily by mixing (A) 100 parts by weight of at least one non-cycloaliphatic epoxy resin containing an average of at least about 1.7 oxirane groups per molecule and an epoxy equivalent weight from about 70 to 6,000, (B) from about 1 to about 1,000 parts by weight of an amine-terminated liquid polymer having a carbon-carbon backbone, (C) optionally, a chain extender or cross-linker and (D) optionally, a curing agent.

DETAILED DESCRIPTION

Amine-Terminated Liquid Polymers

The amine-terminated liquid polymers suitable for use in this invention have the formula

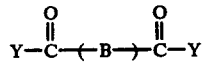

wherein Y is a univalent radical obtained by removing hydrogen from an amine group of an aliphatic, alicyclic, heterocyclic or aromatic amine containing at least two primary and/or secondary amine groups, and B is a polymeric backbone comprising carbon-carbon linkages. Generally the carbon-carbon linkages comprise at least about 90% by weight of total polymeric backbone weight, more preferably at least about 95% by weight of total polymeric backbone weight. The amine-terminated polymers contain an average from about 1.7 to about 3 primary and/or secondary amine groups per molecule, more preferably from about 1.7 to about 2.3 primary and/or secondary amine groups per molecule.

The amine-terminated polymers may have Brookfield viscosities (measured using a Brookfield RVT viscometer at 27° C.) from about 500 cps to about 2,500,000 cps, more preferably from about 500 cps to about 500,000 cps.

The amine-terminated liquid polymers can be prepared easily by reacting a carboxyl-terminated or ester-terminated liquid polymer having a carbon-carbon backbone with at least one aliphatic, alicyclic or heterocyclic amine containing at least two primary and/or secondary amine groups. Amine-terminated liquid polymers can also be prepared easily by reacting an acid chloride-terminated liquid polymer having a carbon-carbon backbone with at least one aliphatic, alicyclic, heterocyclic or aromatic amine containing at least two primary and/or secondary amine groups.

The carboxyl-terminated liquid polymers used may have Brookfield viscosities from about 500 cps. to about 500,000 cps., more preferably from about 500 cps. to about 250,000 cps., and have polymeric backbones comprising carbon-carbon linkages. The carboxyl functional groups are located at least at the ends of a polymer molecule, but there may also be additional group(s) located pendant to a polymer backbone. The average number of total carboxyl groups typically is from about 1.7 to about 3 groups per molecule, more preferably from about 1.7 to 2.3 groups per molecule.

Carboxyl-terminated liquid polymers having carbon-carbon backbone linkages may contain polymerized units of at least one vinylidene monomer having at least one terminal $CH_2{=}C{<}$ group and selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene and the like; (b) dienes containing 4 to 10 carbon atoms, more preferably 4 to 8 carbon atoms, such as butadiene, isoprene, 2-isopropyl-1,3-butadiene, chloroprene, and the like; (c) vinyl and allyl esters of carboxylic acids containing 2 to 8 carbon atoms such as vinyl acetate, vinyl propionate; allyl acetate, and the like; (d) vinyl and allyl ethers of alkyl radicals containing 1 to 8 carbon atoms such as vinyl methyl ether, allyl methyl ether, and the like; and (e) acrylic acids and acrylates having the formula

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate and the like. Often two or more types of these polymerized monomeric units are contained in the polymeric backbone.

More preferred liquid polymers contain polymerized units of at least one vinylidene monomer having at least one terminal CH$_2$=C< group and are selected from the group consisting of (a) monoolefins containing 2 to 14 carbon atoms, more preferably 2 to 8 carbon atoms; (b) dienes containing 4 to 10 carbon atoms, more preferably 4 to 8 carbon atoms; and (e) acrylic acids and acrylates having the formula

wherein R is hydrogen or an alkyl radical containing 1 to 3 carbon atoms and R$^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably R$^1$ is hydrogen or an alkyl radical containing 1 to 8 carbon atoms. Excellent results were obtained which dienes containing 4 to 10 carbon atoms, more preferably 4 to 8 carbon atoms.

The vinylidene monomers described above are readily polymerized with from 0% up to about 50% by weight, more preferably from 0% up to about 35% by weight, of at least one comonomer selected from the group consisting of (f) vinyl aromatics having the formula

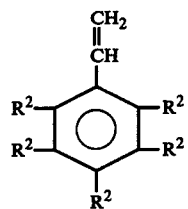

wherein R$^2$ is hydrogen, halogen or an alkyl radical containing from 1 to 4 carbon atoms, such as styrene, α-methyl styrene, chlorostyrene, vinyl toluene, and the like; (g) vinyl nitriles having the formula

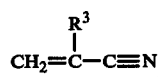

wherein R$^3$ is hydrogen or an alkyl radical containing 1 to 3 carbon atoms, such as acrylonitrile, methacrylonitrile and the like; (h) vinyl halides such as vinyl bromide, vinyl chloride and the like; (i) divinyls and diacrylates such as divinyl benzene, divinyl ether, diethylene glycol diacrylate, and the like; (j) amides of α,β-olefinically unsaturated carboxylic acids containing 2 to 8 carbon atoms such as acrylamide and the like; and (k) allyl alcohol and the like. Liquid polymer compositions comprising polymerized units of a major amount of at least one vinylidene monomer listed in (a) to (e) with a minor amount of at least one comonomer listed in (f) to (k) are within the scope of this invention.

More preferred comonomers may be selected from the group consisting of (f) vinyl aromatics having the formula

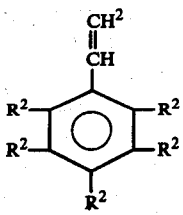

wherein R$^2$ is selected from the group consisting of hydrogen, halogen and alkyl radicals containing 1 to 4 carbon atoms; and (g) vinyl nitriles having the formula

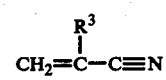

wherein R$^3$ is hydrogen or an alkyl radical containing 1 to 3 carbon atoms. Excellent results were obtained using styrene and acrylonitrile.

Examples of useful liquid polymeric backbones comprising carbon-carbon linkages include polyethylene, polyisobutylene, polyisoprene, polybutadiene, poly(vinyl ethyl ether), poly(ethylacrylate) and poly(butylacrylate) as well as copolymers of butadiene and acrylonitrile; butadiene and styrene; vinyl acetate and isoprene; vinyl acetate and chloroprene; vinyl ethyl ether and diallyl ether; vinyl ethyl ether and α-methyl styrene; vinyl ethyl ether and vinyl bromide; methyl acrylate and butadiene; methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene; ethyl acrylate and butadiene; ethyl acrylate and vinyl acetate; ethyl acrylate and styrene; ethyl acrylate and chlorostyrene; ethyl acrylate, styrene and butadiene; ethyl acrylate and n-butyl acrylate; ethyl acrylate, n-butyl acrylate and 2-ethylhexyl acrylate; ethyl acrylate and 2-ethylhexyl acrylate; ethyl acrylate and vinyl bromide; ethyl acrylate and acrylic acid; ethyl acrylate and acrylamide; ethyl acrylate and allyl alcohol; butyl acrylate, styrene and isoprene; butyl acrylate and styrene; butyl acrylate and acrylonitrile; butyl acrylate and vinyl chloride; and the like.

Liquid carboxyl-terminated polymers may be prepared by free-radical polymerization using carboxyl-containing initiators and/or modifiers as disclosed in U.S. Pat. No. 3,285,949 and German Pat. No. 1,150,205 and by solution polymerization using lithium metal or organo-metallic compounds and post-treating the polymers to form carboxyl groups as disclosed in U.S. Pat. Nos. 3,135,716 and 3,431,235. The polymers can also be prepared by reacting liquid polymers having other than terminal carboxyl groups with compounds so as to yield carboxyl groups. For example, liquid carboxyl-terminated polymers can be prepared from liquid hydroxyl-terminated polymers by reaction with dicarboxyl compounds or anhydrides. Liquid halogen-terminated polymers can be reacted with unsaturated anhydrides in the presence of Lewis acids to yield carboxyl groups. Thus, it is seen that the method of preparing the liquid carboxyl-terminated polymer is not critical to the invention. The essential features of the polymer are that it have at least terminal carboxyl groups and a polymeric backbone of carbon-carbon linkages.

Examples of preferred liquid carboxyl-terminated polymers include carboxyl-terminated polyethylene, carboxyl-terminated polyisobutylene, carboxyl-terminated polybutadiene, carboxyl-terminated polyisoprene, carboxyl-terminated poly(ethylacrylate), as well as carboxyl-terminated copolymers of butadiene and acrylonitrile and of butadiene and styrene. Carboxyl-terminated copolymers of butadiene with acrylonitrile or styrene was found to be especially useful. These polymers may contain from about 50% to about 100% by weight of butadiene, from about 0% to about 40% by weight of acrylonitrile or styrene and from about 0.4% to about 10% by weight of carboxyl, based upon the total weight of polymer.

The carboxyl-terminated liquid polymers can be esterified with an aliphatic monohydric alcohol by methods well known to the art in order to produce ester-terminated liquid polymers. For example, a carboxyl-terminated polymer and an aliphatic monohydric alcohol can be reacted in a distillation column or under reflux in the presence of a small amount of an acid catalyst. Suitable acid catalysts include organic acids containing 1 to 12 carbon atoms, more preferably 1 to 8 carbon atoms, such as acetic acid, propionic acid, benzoic acid, monoesters and diesters of orthophosphoric acid, alkarylsulfonic acids such as p-toluene-sulfonic acid, and the like; inorganic acids such as boric acid, hydrochloric acid, phosphoric acid, sulfuric acid and the like; and Lewis acids such as tetraisopropyl titanate and the like. The amount of acid catalyst used may be as little as about 0.01% up to about 5% by weight based upon total reactant weight. Suitable aliphatic monohydric alcohols for use in the esterification reaction contain from 1 to 12 carbon atoms, more preferably from 1 to 6 carbon atoms, and have boiling points below about 150° C., more preferably below about 100° C. Primary aliphatic monohydric alcohols are preferred. Examples of suitable aliphatic monohydric alcohols include alkanols containing from 1 to 6 carbon atoms, such as methanol, ethanol, 1-propanol, 2-propanol, 1-butanol, 2-hexanol, 3-hexanol, and the like. Other suitable aliphatic monohydric alcohols include 2-methoxyethanol, 2-ethoxyethanol and the like. Excellent results may be obtained using ethanol, 1-propanol or 1-butanol.

The carboxyl-terminated liquid polymers can be acylated by methods well known to the art in order to produce acid chloride-terminated liquid polymers. For example, a carboxyl-terminated polymer can be reacted with thionyl chloride to produce an acid chloride-terminated polymer. HCl and $SO_2$ are evolved primarily as gases and are separated easily from the acid chloride-terminated polymer, and any excess thionyl chloride can be removed easily by vacuum distillation or by washing with a solvent such as methanol. Other suitable but less preferred acylation agents include phosphorus trichloride and phosphorus pentachloride.

Amines which react well with the carboxyl-terminated, ester-terminated and acyl-terminated polymers described heretofore include aliphatic amines containing from 1 to 20 carbon atoms, more preferably from 1 to 12 carbon atoms, and at least two, more preferably two, primary and/or secondary amine groups. Also suitable are alicyclic amines containing from 4 to 20 carbon atoms, more preferably from 4 to 12 carbon atoms, and at least two, more preferably two, primary and/or secondary amine groups. Heterocyclic amines may also be used which contain from 2 to 20 carbon atoms, more preferably from 2 to 12 carbon atoms, and at least two, more preferably two, primary and/or secondary amine groups. Examples of suitable amines just described include aliphatic amines such as ethylenediamine, 1,2-propanediamine, 1,3-propanediamine, 1,4-butanediamine, 2-methyl-1,2-propanediamine, 1,5-pentanediamine, 1,6-hexanediamine, 1,7-heptanediamine, 1,8-octanediamine, 1,10-decanediamine, 1,12-dodecanediamine and the like; aliphatic polyamines such as diethylenetriamine, triethylenetetramine, tetraethylenepentamine, bis(hexamethylene)triamine, 3,3'-iminobispropylamine, and the like; alicyclic diamines and polyamines such as 1,2-diaminocyclohexane, 1,8-p-menthanediamine and the like; and heterocyclic diamines and polyamines such as 4-(aminomethyl)piperidine; piperazine; N-(aminoalkyl)piperazines wherein each alkyl group contains from 1 to 12 carbon atoms, more preferably 1 to 6 carbon atoms, such as N-(2-aminoethyl)piperazine, N-(3-aminopropyl)piperazine, N,N'-bis(3-aminopropyl)piperazine, and the like.

More preferably the amines just described contain at least two primary and/or secondary amine groups having different reactivities. The presence of amine groups having different reactivities makes the amine-termination reaction more likely than the coupling of the liquid polymers, and a smaller amine excess is required in order to avoid coupling. Examples of more preferred amines include some alicyclic amines such as 1,8-p-menthanediamine and the like; and some heterocyclic amines such as 4-(aminomethyl)piperidine and N-(aminoalkyl)piperazines wherein the alkyl group contains from 1 to 12 carbon atoms, more preferably 1 to 6 carbon atoms, such as N-(2-aminoethyl)piperazine, N-(3-aminopropyl)piperazine, and the like. Excellent results were obtained using N-(2-aminoethyl)piperazine.

Aromatic diamines and polyamines can be used to produce amine-terminated polymers. The high temperature required for aromatic amine reaction with carboxyl-terminated polymers causes excessive degradation of reactants and products and is therefore much less preferred. However, aromatic amines react well with the acyl-terminated polymers described heretofore. Suitable aromatic amines contain at least two primary or secondary amine groups bonded directly to at least one aromatic nucleus. Examples of suitable aromatic amines include 4,5-acenaphthenediamine, 3,5-diaminoacridine, 1,4-diaminoanthraquinone, 3,5-diaminobenzoic acid, 2,7-fluorenediamine, 1,5-naphthalenediamine, 1,8-naphthalenediamine, 2,4-toluenediamine, 2,6-toluenediamine, o-phenylenediamine, m-phenylenediamine, p-phenylenediamine and the like.

A solvent is not required for the amine-termination reaction but may be used. Mixtures of solvents may also be used. Suitable solvents include aliphatic and cycloaliphatic ethers containing from 3 to 10 carbon atoms, more preferably from 3 to 6 carbon atoms, such as tetrahydrofuran, diethylether and the like; halogenated aliphatic hydrocarbons containing from 1 to 10 carbon atoms, more preferably from 1 to 6 carbon atoms, such as chloroform, carbon tetrachloride, 1,2-dichloroethylene, trichloroethylene, tetrachloroethylene and the like; and esters containing from 3 to 10 carbon atoms, more preferably from 3 to 6 carbon atoms, such as ethyl acetate, n-butyl acetate, hexyl acetate, benzyl acetate, methyl propionate, ethyl propionate and the like. Also suitable as solvents and more preferred are aromatic compounds having the formula

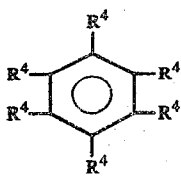

wherein $R^4$ is hydrogen, halogen or an alkyl radical containing 1 to 3 carbon atoms, and at least two $R^4$s are hydrogen. More preferably $R^4$ is hydrogen, chlorine, or an alkyl radical containing 1 to 2 carbon atoms, and at least three $R^4$s are hydrogen. Suitable aromatic solvents include benzene, chlorobenzene, toluene, o-, m- and p-xylene, o-, m- and p-diethylbenzene, cumene, mesitylene and the like.

A sufficient quantity of at least one amine described heretofore may be reacted with a carboxyl-terminated, ester-terminated or acid-chloride-terminated liquid polymer described heretofore in order to produce an amine-terminated liquid polymer containing from about 1.7 to about 3 primary and/or secondary amine groups per molecule. Typically the average number of total carboxyl, ester or acid chloride groups in a liquid polymer before reaction will be from about 1.7 to about 3 groups per molecule, more preferably from about 1.7 to about 2.3 groups per molecule. In this typical case, from about 1.2 to about 6 mole equivalents and more, more preferably from about 1.2 to about 3 mole equivalents of at least one amine described heretofore can be used per mole equivalent of carboxylated, esterified or acylated liquid polymer described heretofore. However, when the carboxylated, esterified or acylated liquid polymer also contains polymerized therein appreciable amounts of acrylic acid, acrylates or the like, the amount of amine reacted must be limited so that the amine-terminated liquid polymer contains no more than about 1.7 to about 3 primary and/or secondary amine groups per molecule.

No catalyst is required, and many types of mixing apparatus can be used in the amine termination reaction. For example, simple mixers can be used, including turbine stirrers as well as propeller mixers. Reaction components can be combined in any order. The reaction mixture may be heated (or refluxed if a solvent is used) at a temperature from about 80° C. to about 150° C., typically for about 1 to 6 hours. The amine-terminated liquid polymer may be purified by vacuum distillation or by washing with a solvent such as a benzene-methanol mixture, followed by drying the polymer. Amine content of the amine-terminated liquid polymers can be analyzed qualitatively by infrared spectroscopy. Amine content can also be analyzed quantitatively following the procedure described by Siggia, *Quantitative Organic Analysis via Functional Groups*, N.Y., Wiley and Sons, Inc., 1963, pp. 452–456.

Reaction Products of Non-Cycloaliphatic Epoxy Resins and Amine-Terminated Liquid Polymers The compositions of this invention comprise (A) 100 parts by weight of at least one non-cycloaliphatic epoxy resin described hereinafter and (B) from about 1 to about 1,000 parts by weight of an amine-terminated liquid polymer described heretofore. Compositional properties may be varied widely by using varying amounts of amine-terminated liquid polymer. Chain extenders, cross-linkers and curing agents described hereinafter may also be used in the epoxy compositions but are not required. Typical compositional properties are summarized in Table I.

TABLE I

| Parts by Weight of Amine-Terminated Liquid Polymer[1] per 100 Parts by Weight of Epoxy Resin[2] | | Compositional Properties[3] | | |
|---|---|---|---|---|
| | | Description | Approximate Tensile Strength, psi | Approximate Ultimate Elongation % |
| About 1 - | 20 | Toughened Plastic | 6000 - 12000 | 1 ~ 15 |
| About 20 - | 100 | Flexibilized Plastic | 2500 - 7000 | 10 ~ 50 |
| About 100 - | 250 | Rigid Elastomer | 2000 - 4000 | 40 ~ 150 |
| About 250 - | 500 | Elastomer | 1000 - 3000 | 100 ~ 500 |
| About 500 - | 1000 | Soft Elastomer | 100 - 1000 | 300 ~ 1000 |

[1]Amine equivalent weight per hundred parts (Ephr) of the polymer = 0.05 ± 0.01.
[2]Diglycidyl ether of bisphenol A epoxy resin having an epoxy equivalent weight of 175 - 200.
[3]Composition contained 24 parts of bisphenol A chain extender per 100 parts by weight of epoxy resin.

Surprisingly and unexpectedly, all compositions summarized in Table I are curable at room temperature (about 20°-25° C.) with cure time increasing as the level of amine-terminated liquid polymer is decreased. The compositions are hydrolytically stable and generally do not require a catalyst or curing agent, although a catalyst or curing agent may be used.

Non-cycloaliphatic epoxy resins suitable for use in this invention together with amine-terminated liquid polymers contain at least an average of about 1.7 oxirane

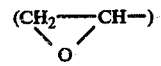

groups per molecule, more preferably from about 1.7 to about 3.0 oxirane groups per molecule, and even more preferably from about 1.7 to about 2.3 oxirane groups per molecule. The non-cycloaliphatic epoxy resins may be liquids or low-melting solids but are preferably liquids having a bulk viscosity from about 200 centipoises to about 2,000,000 centipoises (measured using a Brookfield RVT viscometer at 25° C.). The epoxy resins can have an epoxy equivalent weight (gram molecular weight per epoxy group) from about 70 to about 6,000, more preferably from about 70 to about 2,000. Suitable non-cycloaliphatic epoxy resins include epoxidized cyclic silane, epoxidized soybean oil, polyglycidyl esters of polycarboxylic acids, epoxidized polyolefins, and glycidyl ether resins, with glycidyl ether resins being preferred. Examples of suitable polyglycidyl esters of polycarboxylic acids include the diglycidyl ester of linoleic dimer acid, the triglycidyl ester of linoleic trimer acid and the like. Suitable glycidyl ether resins include polyallyl glycidyl ether; the diglycidyl ether of chlorendic diol; the diglycidyl ether of dioxanediol; the diglycidyl ether of endomethylene cyclohexanediol; epoxy novolac resins; alkanediol diglycidyl ethers; alkanetriol triglycidyl ethers; and the like.

More preferred glycidyl ether resins include alkanediol diglycidyl ethers having the formula

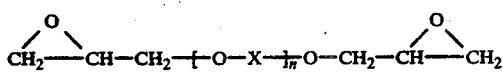

wherein X is an alkylene or alkylidene group containing from 1 to 10 carbon atoms, more preferably from 2 to 6 carbon atoms, and n is from 1 to 25, more preferably from 1 to 15. Suitable alkanediol diglycidyl ethers include ethylene glycol diglycidyl ether, propylene glycol diglycidyl ether, butanediol diglycidyl ether, and the like.

Other more preferred glycidyl ether resins include alkanetriol triglycidyl ethers wherein the alkane group contains from 2 to 10 carbon atoms, more preferably from 3 to 6 carbon atoms, such as glyceryl triglycidyl ether, the triglycidyl ether of trimethylolpropane and the like. Another more preferred class of glycidyl ether resins is the di- and polyglycidyl ethers of bisphenols, the bisphenols having the formula

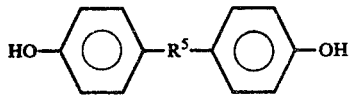

wherein $R^5$ is a bivalent radical containing 1 to 8 atoms of at least one atom selected from the group consisting of C, O, S and N, more preferably an alkylene or alkylidene group containing 1 to 8 carbon atoms, and even more preferably an alkylene or alkylidene group containing 1 to 6 carbon atoms. Examples of suitable bisphenols include methylene bisphenol, isopropylidene bisphenol, butylidene bisphenol, octylidene, bisphenol, bisphenol sulfide, bisphenol sulfone, bisphenol ether, bisphenol amine, and the like. Excellent results were obtained using isopropylidene bisphenol. Examples of suitable di- and polyglycidyl ethers include those of isopropylidene bisphenol having the formula

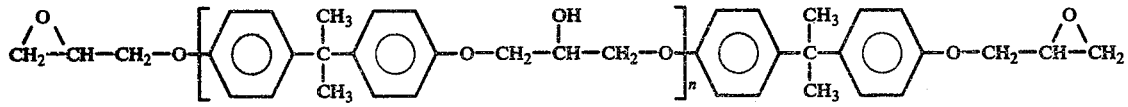

wherein n is from about 0 to about 20, more preferably from about 0 to about 2.

Cycloaliphatic epoxy resins are much less preferred in this invention because they are substantially uncurable at room temperature when mixed with an amine-terminated liquid polymer. By cycloaliphatic epoxy resin is meant a resin in which an epoxy group is itself part of a cycloaliphatic ring structure. Such cycloaliphatic resins include bis(2,3-epoxycyclopentyl)ether, dicyclopentadiene dioxide, the bis(epoxydicyclopentyl) ether of ethylene glycol, 3,4-epoxycyclohexylmethyl-(3,4-epoxy)-cyclohexane carboxylate, bis(3,4-epoxy-6-methylcyclohexylmethyl) adipate and the like. Other cycloaliphatic resins are described in Lee et al, *Handbook of Epoxy Resins*, McGraw-Hill Book Company, N.Y., 1967, Chapter 4.

Other reactive additives are not required in the compositions of this invention comprising an amine-terminated liquid polymer and an epoxy resin. However, chain extenders and/or cross-linkers may be used. The amount of chain extender and/or cross-linker used may vary widely depending on relative weights and reactive functionalities of epoxy resins and amine-terminated liquid polymers. The amount of chain extender and/or cross-linker used also depends on properties desired in the compositions of this invention. Typical amounts of chain extender and/or cross-linker used may vary from about 0 to about 60 parts by weight, more preferably from about 0 to about 35 parts by weight per 100 parts by weight of epoxy resin.

Suitable chain extenders and/or cross-linkers can be any of the difunctional materials known by those skilled in the art to be reactive with epoxy compounds, including dibasic acids such as azelaic acid, phthalic acid and the like; and dimercaptans such as 1,6-hexanedithiol, 1,8-octanedithiol and the like. Also suitable as chain extenders are anhydrides such as maleic anhydride, succinic anhydride, phthalic anhydride, hexahydrophthalic anhydride and the like; diisocyanates such as 4,4'-dicyclopentylmethylene diisocyanate, 4,4'-diphenylmethylene diisocyanate, 2,4-tolylene diisocyanate, 2,6-tolylene diisocyanate, 1,4-phenylene diisocyanate and the like; di- and polyamines described in detail heretofore in connection with preparation of the amine-terminated liquid polymer and including the diamine made by reacting linoleic acid dimer with a diamine, ethylenediamine, N-(2-aminoethyl)piperazine and the like; and aliphatic dihalides containing from 1 to 12 carbon atoms, more preferably aliphatic dihalides containing from 1 to 8 carbon atoms wherein the halide is bromide and/or chloride, such as 1,4-dibromobutane, 1,3-dibromobutane, 1,4-dichlorobutane, 1,2-dichloroethane, 1,4-diiodobutane, 1,6-dichlorohexane, and the like.

Also suitable as chain extenders and/or cross-linkers and more preferred in this invention are dihydric aromatic compounds containing from 6 to 24 carbon atoms, more preferably from 6 to 18 carbon atoms. Suitable dihydric aromatic compounds include catechol, resorcinol, 3-hydroxybenzyl alcohol, 4-hydroxybenzyl alcohol, 1,3-dihydroxynaphthalene, 1,5-dihydroxynaphthalene, 1,7-dihydroxynaphthalene, and, even more preferably, bisphenols having the formula

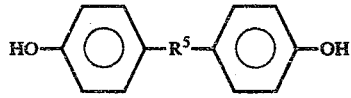

wherein $R^5$ is a bivalent radical containing 1 to 8 atoms of C, O, S and/or N, more preferably an alkylene or alkylidene group containing 1 to 8 carbon atoms, and even more preferably an alkylene or alkylidene group containing 1 to 6 carbon atoms. Examples of suitable bisphenols include methylene bisphenol, isopropylidene bisphenol, butylidene bisphenol, octylidene bisphenol, bisphenol sulfide, bisphenol sulfone, bisphenol ether, bisphenol amine and the like. Excellent results were obtained using isopropylidene bisphenol (bisphenol A).

Curing agents may be used to accelerate and/or supplement the reaction between the epoxy resin and amine-terminated liquid polymer described heretofore but are not required. Suitable curing agents include BF₃-amine complexes, hexahydrophthalic anhydride, dicyandiamide, imidazoles such as 2-ethyl-4-methylimidazole, triethylenetetramine and the like.

In addition to the two essential components (an amine-terminated liquid polymer and an epoxy resin) and the two optional components (a chain extender or a curing agent) described heretofore, the composition of this invention may contain a broad range of other compounding ingredients. These ingredients are typical ingredients used in rubber and/or epoxy compounding. Standard levels of these ingredients are used, such levels being well known in the art. A preferred limitation placed on the levels of compounding ingredients is that the composition containing these ingredients should be flowable, i.e., castable at temperatures ranging from about 20° C. to about 100° C. This generally limits the amount of reinforcing fillers and other ingredients which thicken the liquid composition to low levels of up to about 50 parts by weight at room temperature based upon 100 parts by weight of the mixture of epoxy resin and amine-terminated liquid polymer. If a solvent such as kerosene or the like is used, even higher amounts of compounding ingredients can be used.

Examples of compounding ingredients include reinforcing fillers such as carbon blacks, metal carbonates and silicates, and glass, asbestos, and textile fibers; colorants such as metal oxides and metal sulfides, and organic colorants; lubricants and plasticizers such as petroleum oils, castor oil, glycerin, silicones, aromatic and paraffinic oils, and alkyl and aromatic phthalates, sebacates, trimellitates, and the like; and antioxidants and stabilizers such as phenyl-$\beta$-naphthylamine, 2,6-di-t-butyl paracresol, 2,2'-methylenebis-(4-ethyl-6-t-butyl phenol), 2,2'-thiobis-(4-methyl-6-t-butylphenol), 4,4'-butylidenebis-(6-t-butyl-m-cresol), tris-(3,5-di-t-butyl-4-hydroxybenzyl)isocyanurate, hexahydro-1,3,5-tris-$\beta$-(3,5-di-t-butyl-4-hydroxyphenyl)propionyl triazine, tetrakismethylene-3(3',5'-di-t-butyl-4'-hydroxyphenyl)-propionate methane, distearyl thiodipropionate, tri(-nonylated phenyl) phosphite, and the like.

The epoxy resin compositions of this invention comprise (A) 100 parts by weight of a non-cycloaliphatic epoxy resin described heretofore, (B) from about 1 to about 1,000 parts by weight of an amine-terminated liquid polymer described heretofore, (C) optionally, a chain extender and/or cross-linker, (D) optionally, a curing agent and (E) optionally, other compounding ingredients described heretofore. The composition components can be mixed using mixing kettles, Henschel mixers, ink mills, Banbury mixers or the like. Standard mixing techniques can be used. A curing agent, if used, is preferably mixed first with the amine-terminated liquid polymer.

Heating the mixture up to about 100° C. may be helpful to obtain dissolution and uniform dispersion of the materials, but such heating causes the compositions to cure much more rapidly. The reaction mixture is generally castable before curing and can be centrifugally cast, roto-molded or poured into stationary trays or molds. The reaction mixture can also be used for liquid injection molding (LIM), also called reactive injection molding (RIM). The latter process is substantially more economical than conventional injection molding and is becoming well known, particularly in the automobile parts industry. The reaction mixtures cure at room temperature, with cure time being accelerated by increasing temperature, amount of curing agent (if used) and/or the amount of amine-terminated liquid polymer. With use of more than 100 parts by weight of amine-terminated liquid polymer per 100 parts by weight of non-cycloaliphatic epoxy resin, gelation of the mixture generally occurs in about 5 minutes to 3 hours. A tack-free state may be reached in about 2 to 5 hours at room temperature, while complete curing may require from 5 hours to 7 days. Use of a dihydric aromatic compound or a dimercaptan described heretofore may reduce the cure time and/or temperature, whereas a dibasic acid may increase the reaction time.

A cured composition of this invention containing up to about 500 parts by weight of amine-terminated liquid polymer per 100 parts by weight of epoxy resin can be characterized as a transparent to opaque solid having two phases, a continuous phase (matrix) and a particulate phase (domain). The size of particles making up the particulate phase may range from about 25° A. to about 5$\mu$ in diameter. The particles may vary in diameter according to a normal distribution curve or may have size ranges following a bimodal distribution curve or even a more multi-peaked distribution curve. A phase inversion point typically occurs at about 20–50 parts by weight of amine-terminated liquid polymer per 100 parts by weight of epoxy resin, depending upon the amount of chain extender and/or cross-linker used, epoxy resin molecular weight, and molecular weight and acrylonitrile content of amine-terminated liquid polymer.

Thus a cured composition of this invention containing from about 1 to about 50 parts by weight of amine-terminated liquid polymer per 100 parts by weight of epoxy resin has a continuous hard epoxy phase and a particulate rubbery phase. The continuous phase is a hard solid having a higher glass transition temperature than that of the discrete phase. The continous phase comprises a major amount of epoxy resin, a minor amount of an amine-terminated polymer, a small amount of a chain extender (if used), and a small amount of curing agent (if used). The particulate phase comprises a major amount of an amine-terminated polymer, a minor amount of an epoxy resin, a small amount of a chain extender (if used), and a small amount of a curing agent (if used). The continuous and particulate phases are bonded chemically to one another. The chemical bond is formed in situ during cure between epoxy groups of an epoxy resin and amine groups of an amine-terminated liquid polymer. The two-phase system just described improves toughness properties of the cured composition without substantial deterioration of other thermal or mechanical properties. Thus toughness properties such as crack resistance (measured by fracture surface energy according to the procedure cited in Riew et al, *Rubber Toughened Thermosets*, Symposium on Toughness and Brittleness of Plastics, Division of Organic Coatings and Plastics Chemistry, 168th A.C.S. National Meeting, Atlantic City, N.J., September 12, 1974), Gardner impact strength and Izod impact strength are improved without substantial deterioration of other thermal or mechanical properties. Such other properties include heat distortion temperature, tensile strength and the like.

On the other hand, a cured composition containing from about 50 to about 500 parts by weight of amine-terminated liquid polymer per 100 parts by weight of epoxy resin has a continuous rubbery phase and a particulate hard phase. The continuous phase is a solid having a lower glass transition temperature than that of the discrete phase. The continous phase comprises a major amount of an amine-terminated liquid polymer, a minor amount of an epoxy resin, a small amount of a chain extender (if used), and a small amount of a curing agent (if used). The particulate phase comprises a major amount of an epoxy resin, a minor amount of an amine-terminated liquid polymer, a small amount of a chain extender (if used), and a small amount of a curing agent (if used). The continuous and particulate phases are bonded chemically to one another. The chemical bond is formed in situ during cure between epoxy groups of an epoxy resin and amine groups of an amine-terminated liquid polymer. The hard epoxy particles may have a reinforcing effect comparable to that of carbon black in natural or synthetic rubber. Generally a smaller particle size yields a cured composition having high modulus and hardness, while a large particle size yields a cured composition having lower modulus and hardness.

Mixtures of 100 parts by weight of an epoxy resin described heretofore and from about 300 to about 1,000 parts by weight of at least one amine-terminated liquid polymer described heretofore can generally be applied in liquid form by spraying, casting, painting, dipping or the like before curing is complete. For example, a liquid mixture of a non-cycloaliphatic epoxy resin; an amine-terminated liquid polymer; optionally, a chain extender such as a dihydric aromatic compound (e.g., Bisphenol A) described heretofore; optionally, a suitable pigment or coloring agent such as $TiO_2$ or the like; and optionally, a solvent such as kerosene or the like can be deposited by painting or the like on a tire sidewall, and the paint cured to produce a colored tire sidewall surface or facing. This process of making a colored tire sidewall surface is substantially simpler than the typical prior art method. The prior art molded a layer of elastomeric material colored other than black into a tire as an intermediate layer, cured the tire, and finally abraded away the black rubber covering the colored layer in order to form a clearly defined colored sidewall surface.

The liquid tire-sidewall coating materials of this invention have other advantages besides simplicity. Reflective elements such as transparent glass beads or the like can be dropped on an applied layer of the coating material before cure in order to form a surface that reflects light and is conspicuous at night. Moreover, the coating materials may be supplied in kit form for use by car owners or tire retailers. Since the epoxy resin and amine-terminated liquid polymer cure at room temperature when mixed together, they should be kept separate until just before application.

A variety of methods may be used to apply a coating material described heretofore to a tire sidewall, preferably to a groove in the sidewall. The surface to be coated may be cleaned beforehand by wiping it with a solvent such as toluene or the like. Thereafter a coating may be extruded into a sidewall groove and allowed to flow by itself. Alternatively, the coating can be deposited in a sidewall groove and spread out with a squeegee-type tool. Still other methods involve brushing or spraying the coating onto the sidewall. The coating typically may have a thickness from about 1 mil to about 100 mils, more preferably from about 2 mils to about 60 or 70 mils. The coating material cures at room temperature but is preferably heated in order to hasten the cure using a heat lamp or heat gun to a temperature from about 150° F. to about 250° F. for about 30-60 minutes.

The following examples illustrate the present invention more fully. Table IV demonstrates toughened compositions of this invention, while Tables I-III and V-XI demonstrate elastomeric compositions.

EXAMPLES

General Mixing Procedure

The novel vulcanizates were prepared following a general mixing procedure. All additives except a curing agent (if used) were mixed with an epoxy resin in a mixing kettle. A curing agent (if used) was mixed with an amine-terminated liquid polymer in a second mixing vessel. In each case mixing was done at about 40°-80° C. under vacuum (about 100 mmHg) in order to remove entrapped air. The two mixes were combined and stirred under vacuum at about the same temperature for about 5 minutes, and the final mixture was poured thereafter into a tensile sheet mold (or other suitable mold), or was molded centrifugally or painted as described hereinafter. Viscosity of the mixture before curing was typically less than 100,000 centipoises, and the mixture was readily castable in molds as described heretofore. The mold assembly was opened after curing and the vulcanizate removed for testing.

Materials

The amine-terminated liquid polymers used in the following examples were prepared readily by following the procedures described in detail heretofore using N-(2-aminoethyl)-piperazine in the amine-termination reaction. The amine-terminated liquid polymers identified as ATBN, were amine-terminated poly(butadiene/acrylonitrile) copolymers having a butadiene content of about 67.2% by weight of polymer, an acrylonitrile content of about 16.4% by weight of polymer unless otherwise noted hereafter, and an amine end group content of about 13.4% by weight of polymer. The ATBN polymers had a viscosity at 27° C. of about 270,000 and a molecular weight of about 3,550. The amine-terminated liquid polymers identified as ATB were amine-terminated polybutadienes having a viscosity at 27° C. of about 240,000 and a molecular weight of about 4200.

The non-cycloaliphatic epoxy resin most frequently used was a liquid diglycidyl ether of bisphenol A (DGEBA) having an epoxy equivalent weight of about 185 to 192 and a viscosity at 25° C. of about 10,000 to 16,000 cps. The DGEBA resin is sold under the trademark "Epon 828" by Shell Chemical Company. Another non-cycloaliphatic epoxy resin used was the triglycidyl ether of glycerol having an epoxy equivalent weight of about 140 to 160 and a viscosity at 25° C. of about 100-170, this resin being sold under the trademark "Epon 812" by Shell Chemical Company. Yet another non-cycloaliphatic epoxy resin used was 1,4-butanediol diglycidyl ether having an epoxy equivalent weight of about 136 and a viscosity at 25° C. of about 19 cps. The latter material is sold under the trademark "Araldite RD-2" by Ciba Products Co.

Except for the amine-terminated liquid polymers described in detail heretofore, the non-cycloaliphatic epoxy resins, chain extenders, curing agents and other materials used in the following examples are known commercial materials and are readily available.

Test Methods

Physical testing of the compositions of this invention was performed according to the following procedures. Modulus, tensile strength and ultimate elongation of elastomeric materials were determined according to ASTM D412 using oval samples having a 4-inch mean perimeter except where noted; in the latter cases Die C dumbbells were used. Gehman freeze point was tested according to ASTM D1053. Compression set was measured according to ASTM D395B at 100° C. for 70 hours. Tear resistance was tested according to ASTM D624 using Die C. Pico abrasion resistance was measured according to ASTM D2228 using a 5.5 kg weight, a 60 rpm speed and 80 revolutions. Abrasion index was calculated according to Sec. 11.3 of the latter procedure. Durometer hardness was measured according to ASTM D676 using a Shore Type A durometer and a one-second indentation hardness time interval. Fracture surface energy was tested following the procedure cited in Riew etal, *Rubber Toughened Thermosets*, Symposium on Toughness and Brittleness of Plastics Chemistry, 168th A.C.S. National Meeting, Atlantic City, N.J., September 12, 1974. Gardner impact was measured using a Gardner impact tester and a dart having a 0.5-inch tip radius. Heat distortion temperature was tested according to ASTM D648. Tensile strength and elastic modulus of plastic materials in Table IV were tested according to ASTM D638.

EXAMPLES 1–18

Examples 1–18 demonstrate production of elastomeric compositions using a non-cycloaliphatic epoxy resin; an amine-terminated liquid polymer; optionally, isopropylidene bisphenol chain extender, and optionally, dioctyl phthalate plasticizer. Examples 1–12 demonstrate elastomeric compositions both with and without an isopropylidene bisphenol chain extender. Examples 11 and 12 illustrate the plasticizing effect of dioctyl phthalate together with use of isopropylidene bisphenol. Test results for examples 1–12 are set forth in Tabl II. Test samples for Examples 13–18 were molded centrifugally at about 500–1,000 rpm. Test samples were cured by spinning for about 50 min. at about 90° C. and thereafter placed in an oven for about 120 min. at about 120° C. Test results for Examples 13–18 are set forth in Table III.

TABLE II

| Example | 1 | 2 | 3 | 4 | 5 | 6 | 7 | 8 | 9 | 10 | 11* | 12* |
|---|---|---|---|---|---|---|---|---|---|---|---|---|
| Recipe | | | | | | | | | | | | |
| Epon 828, Wt. Parts | 100 | 100 | 100 | 100 | 100 | 100 | 100 | 100 | 100 | 100 | 100 | 100 |
| ATBN, Wt. Parts | 100 | 150 | 200 | 250 | 275 | 300 | 300 | 325 | 350 | 400 | 150 | 150 |
| Bisphenol, A, Wt. Parts | 24 | 24 | 24 | 24 | 24 | 24 | — | 24 | 24 | 24 | 24 | 24 |
| Dioctyl Phthalate, Wt. Parts | — | — | — | — | — | — | — | — | — | — | 10 | 20 |
| Test Data | | | | | | | | | | | | |
| Cure Cycle, ° C/Hrs. | 120/21 | 120/21 | 120/19 | 120/18 | 120/21 | 120/21 | 120/22 | 120/19 | 120/17 | 120/18 | 120/16 | 120/16 |
| 100% Modulus, psi** | — | — | — | 982 | 845 | 706 | — | 586 | 567 | 406 | 2086 | 1784 |
| Tensile strength, psi** | 2659 | 2023 | 1618 | 1283 | 1134 | 1044 | 695 | 963 | 941 | 802 | 2197 | 1856 |
| Ultimate Elongation,%** | 43 | 72 | 98 | 146 | 154 | 181 | 94 | 210 | 204 | 263 | 110 | 106 |
| Gehman Freeze Pt., ° C | −72 | −71 | −63 | −54 | −55 | −48 | −49.5 | −52 | −57 | −54.5 | — | — |
| Compression Set, % | 63.7 | 54.1 | 70.9 | 68.0 | 62.3 | 61.5 | 80.2 | 69.0 | 68.6 | 46.7 | 61.1 | 85.2 |
| Tear Resistance, lbs/in. | 215 | 223 | 215 | 181 | 168 | 154.2 | 76 | 157 | 157.4 | 132 | 334.3 | 295.8 |
| Pico Abrasion Index | 31 | 34 | 40 | 28 | 27 | 26 | — | — | 19 | — | 23 | 21 |
| Durometer Hardness, Type A | 98 | 97 | 97 | 91 | 90 | 87 | 73 | 83 | 83 | 81 | — | — |

*Tested using Die C dumbell samples
**Tested at 25° C

TABLE III

| Example | 13* | 14* | 15* | 16* | 17* | 18* |
|---|---|---|---|---|---|---|
| Recipe | | | | | | |
| Epon 828, Wt. Parts | 100 | 100 | 100 | 100 | 100 | 100 |
| ATBN, Wt. Parts | 100 | 150 | 300 | 450 | 450 | 500 |
| Bisphenol A, Wt. Parts | 24 | 24 | 24 | 24 | 24 | 24 |
| Test Data | | | | | | |
| 100% Modulus, psi** | — | — | — | 194 | 218 | 186 |
| 100% Modulus, psi*** | — | — | — | 52 | 59 | 48 |
| 200% Modulus, psi** | — | — | — | 274 | 344 | 251 |
| 200% Modulus, psi*** | — | — | — | 81 | 97 | — |
| Tensile Strength, psi** | 2878 | 2260 | 1349 | 459 | 486 | 306 |
| Tensile Strength, psi*** | 707 | 553 | 273 | 113 | 104 | 69 |
| Ultimate Elongation, %** | 9 | 95 | 170 | 317 | 260 | 240 |
| Ultimate Elongation, %*** | 100 | 113 | 130 | — | — | 165 |
| Gehman Freeze Point, ° C | — | −80 | −54 | −52.5 | −50 | −50.5 |
| Compression, Set,% | 75.4 | 73 | 31.7 | 84 | 68.3 | — |
| Tear Resistance, lbs/In. | 366 | 332 | 175 | 120 | 128 | 93 |
| Pico Abrasion Index | 28 | 33 | 25 | 22 | 23 | Cut Through |
| Durometer Hardness, Type A | 95 | 95 | 85 | 72 | 72 | 66 |

*Tested using Die C dumbbell samples
**Tested at 25° C
***Tested at 80° C

EXAMPLES 19–24

Examples 21–24 demonstrate production of toughened compositions using a non-cycloaliphatic epoxy resin; an amine-terminated liquid polymer; an isopropylidene bisphenol (bisphenol A) chain extender; and a piperidine curing agent. Example 19 is a control experiment in which no amine-terminated liquid polymer was used. Example 20 is a comparison experiment using a carboxyl-terminated liquid polymer. The carboxyl-terminated polymer, identified as CTBN, is a carboxyl-terminated poly(butadiene/acrylonitrile) liquid polymer having an acrylonitrile content of about 17.5% by weight of polymer, a carboxyl content of about 2.3% by weight of polymer, a Brookfield viscosity at 27° C. of about 120,000 cps and a molecular weight of about 3,300. Compositions in examples 21-24 demonstrate toughness about the same as a composition containing a carboxyl-terminated liquid polymer in place of an amine-terminated liquid polymer (Example 20). Examples 21-24 also demonstrate that compositional toughness is increased substantially in comparison to Example 19, where no such liquid polymer was used. Thus the amine-terminated liquid polymers of this invention are shown to be effective tougheners of the non-cycloaliphatic epoxy resin compositions. Test results are set forth in Table IV.

EXAMPLES 25-33

Examples 25-33 demonstrate the effect of azelaic acid as a chain extender in elastomeric compositions of this invention. Azelaic acid was found to be a moderate reaction retarder, useful in prolonging pot life of the compositions. Mechanical properties of compositions containing azelaic acid are generally somewhat lower than compositions containing bisphenol A. Test results are summarized in Table V.

TABLE V

| Example | 25 | 26 | 27 | 28 | 29 | 30 | 31 | 32 | 33 |
|---|---|---|---|---|---|---|---|---|---|
| Recipe | | | | | | | | | |
| Epon 828, Wt. Parts | 100 | 100 | 100 | 100 | 100 | 100 | 100 | 100 | 100 |
| ATBN, Wt. Parts | 100 | 150 | 200 | 250 | 275 | 300 | 325 | 350 | 400 |
| Azelaic Acid, Wt. Parts | 20 | 20 | 20 | 20 | 20 | 20 | 20 | 20 | 20 |
| Test Data | | | | | | | | | |
| Cure Cycle, ° C/Hrs. | 120/17 | 120/19 | 120/20 | 120/21 | 120/21 | 120/17 | 120/18 | 120/20 | 120/18 |
| 100% Modulus, psi* | — | — | 902 | — | 381 | 280 | 235 | 274 | 190 |
| Tensile Strength, psi* | 1849 | 1131 | 974 | 577 | 654 | 538 | 447 | 501 | 413 |
| Ultimate Elongation, %* | 37 | 69 | 110 | 146 | 172 | 190 | 194 | 192 | 238 |
| Gehman Freeze Pt., ° C | −71 | −63 | −56 | −54.5 | −54.5 | −52.5 | −52.5 | −52.5 | −53 |
| Compression Set, % | 59.5 | 53.8 | 58.1 | 57.7 | 59.0 | 62.4 | 61.6 | 57.1 | 53.6 |
| Tear Resistance, lbs/in. | 308.8 | 106.2 | 73.9 | 97.2 | 98.2 | 84.7 | 84.6 | 97.1 | 80.5 |
| Pico Abrasion Index | 17 | ** | ** | ** | ** | ** | ** | ** | ** |
| Durometer Hardness, Type A | 98 | 91 | 91 | 83 | 78 | 73 | 72 | 70 | 65 |

*Tested at 25° C
**Cut through sample

TABLE IV

| Example | 19 | 20 | 21 | 22 | 23 | 24 |
|---|---|---|---|---|---|---|
| Recipe | | | | | | |
| Epon 828, Wt. Parts | 100 | 100 | 100 | 100 | 100 | 100 |
| ATBN, Wt. Parts | — | — | 2.5 | 5 | 7.5 | 10 |
| CTBN, Wt. Parts | — | 5 | — | — | — | — |
| Bisphenol A, Wt. Parts | 24 | 24 | 24 | 24 | 24 | 24 |
| Piperidine, Wt. Parts | 5 | 5 | 5 | 5 | 5 | 5 |
| Test Data | | | | | | |
| Elastic Modulus, kpsi | 390 | 376 | 394 | 376 | 397 | 376 |
| Tensile Strength, psi | 8900 | 9600 | 9300 | 8700 | 9300 | 8000 |
| Ultimate Elongation, % | 4.0 | 8.8 | 4.8 | 5.4 | 4.5 | 4.9 |
| Fracture Energy in-lbs/in$^2$ | 1 | 49 | 12 | 35 | 68 | 52 |
| Gardner Impact, in-lbs* | 50 | >320 | >320 | >320 | >320 | |
| Heat Distortion Temperature, ° C | 82 | 82 | 88 | 82 | 82 | 82 |

*Specimen thickness is ⅛"

EXAMPLES 34-42

Examples 34-42 demonstrate the effects of a mixed bisphenol A - azelaic acid chain extender system and varying amounts of amine-terminated liquid polymer in elastomeric compositions of this invention. Test results are set forth in Table VI.

TABLE VI

| Example | 34 | 35 | 36 | 37 | 38 | 39 | 40 | 41 | 42 |
|---|---|---|---|---|---|---|---|---|---|
| Recipe | | | | | | | | | |
| Epon 828, Wt. Parts | 100 | 100 | 100 | 100 | 100 | 100 | 100 | 100 | 100 |
| ATBN, Wt. Parts | 90 | 100 | 100 | 250 | 300 | 400 | 100 | 200 | 300 |
| Bisphenol, A, Wt. Parts | 12.7 | 12 | 12 | 12 | 12 | 12 | 24 | 24 | 24 |
| Azelaic Acid, Wt. Parts | 9.6 | 10 | 9.8 | 10 | 10 | 10 | 20 | 20 | 20 |
| Test Data | | | | | | | | | |
| Cure Cycle, ° C/Hrs. | 120/16 | 120/16 | 120/16 | 120/16 | 120/16 | 120/16 | 120/16 | 120/16 | 120/16 |
| 100% Modulus, psi* | — | — | 1067 | 285 | 300 | 145 | — | 500 | 266 |
| 200% Modulus, psi* | — | — | — | — | 566 | 220 | — | 617 | 356 |
| Tensile Strength, psi* | 2793 | 2443 | 1227 | 505 | 585 | 404 | 2462 | 924 | 590 |
| Ultimate Elongation, %* | 9 | 31 | 122 | 198 | 204 | 318 | 6 | 340 | 376 |
| Gehman Freeze Pt., ° C | ** | ** | −55 | −50.5 | −55 | −53.5 | ** | −62 | −52 |
| Compression Set, % | *** | *** | 57.1 | 62.3 | 52.5 | 55.3 | 48.8 | 91.5 | 87.9 |
| Tear Resistance, lbs/in. | 61.2 | 63.7 | 190 | 111.4 | 123.5 | 75.4 | 486.2 | 231.3 | 176.8 |
| Pico Abrasion Index | 64 | 58 | 72 | **** | **** | **** | 34 | 21 | **** |

TABLE VI-continued

| Example | 34 | 35 | 36 | 37 | 38 | 39 | 40 | 41 | 42 |
|---|---|---|---|---|---|---|---|---|---|
| Durometer Hardness, Type A | 99 | 99 | 93 | 86 | 80 | 65 | 98 | 85 | 86 |

*Tested at 25° C
**Too stiff for measurement
***Sample was too brittle for testing
****Cut through sample

EXAMPLES 43–47

Examples 43–47 demonstrate the effects of varying amounts of 1,4-dibromobutane using a mixed bisphenol A-dibromobutane chain extender system in elastomeric compositions of this invention. Test results are set forth in Table VII.

TABLE VII

| Example | 43 | 44 | 45 | 46 | 47 |
|---|---|---|---|---|---|
| Recipe | | | | | |
| Epon 828, Wt. Parts | 100 | 100 | 100 | 100 | 100 |
| ATBN, Wt. Parts | 300 | 300 | 300 | 300 | 300 |
| Bisphenol A, Wt. Parts | 24 | 24 | 24 | 24 | 24 |
| 1,4-Dibromobutane, Wt. Parts | 20 | 15 | 10 | 5 | 0 |
| Test Data | | | | | |
| Cure Cycle, ° C/Hrs. | 120/16 | 120/16 | 120/16 | 120/16 | 120/16 |
| 100% Modulus, psi* | 1110 | 1373 | — | 790 | 924 |
| Tensile Strength, psi* | 1252 | 1481 | 1377 | 1054 | 1249 |
| Ultimate Elongation, %* | 120 | 111 | 77 | 148 | 153 |
| Gehman Freeze Pt., ° C | −49 | −62 | −62 | −60 | −60 |
| Compression Set, % | 37 | 45 | 27 | 28 | 52 |
| Tear Resistance, lbs/in. | 215 | 278 | 244 | 162 | 183 |
| Pico Abrasion Index | 25 | 25 | 22 | 16 | 21 |
| Durometer Hardness, Type A | 93 | 79 | 97 | 96 | 78 |

*Tested at 25° C

EXAMPLES 48–57

Examples 48–57 demonstrate the effects of varying cure cycles and of varying acrylonitrile content in the carbon-carbon backbone of the amine-terminated liquid polymer. All acrylonitrile content percentages are based upon total weight of amine-terminated liquid polymer. Test results are summarized in Table VIII.

TABLE VIII

| | EXAMPLES 48 – 57 | | | | |
|---|---|---|---|---|---|
| Example | 48* | 49* | 50* | 51* | 52* |
| Recipe | | | | | |
| Epon 828, Wt. Parts | 100 | 100 | 100 | 100 | 100 |
| ATBN, Wt. Parts | 300 | 300 | 300 | 300 | 300 |
| Bisphenol A, Wt. Parts | 24 | 24 | 24 | 24 | 24 |
| Test Data | | | | | |
| Wt. % Acrylonitrile in ATBN | 0 | 10 | 10 | 10 | 17 |
| Cure Cycle, ° C/Hrs | 120/16.5 | 120/14.5 | ** | 120/17 | 120/15 |
| 100% Modulus, psi*** | 897 | 789 | 454 | 566 | 700 |
| 100% Modulus, psi**** | — | 195 | 127 | 153 | 155 |
| 200% Modulus, psi*** | 1348 | 1191 | 673 | 836 | 1117 |
| 200% Modulus, psi**** | — | — | — | — | 252 |
| Tensile Strength, psi*** | 1680 | 1627 | 1229 | 1125 | 1844 |
| Tensile Strength, psi**** | — | 288 | 179 | 239 | 282 |
| Ultimate Elongation, %*** | 249 | 271 | 365 | 284 | 300 |
| Ultimate Elongation, %**** | — | 177 | 190 | 197 | 220 |
| Gehman Freeze Pt., ° C | −80 | −76 | −69 | −74 | −58 |
| Compression Set, % | 28.6 | 26.9 | 39.1 | — | 28.8 |
| Tear Resistance, lbs/in. | 190.9 | 199.4 | 165.8 | 191 | 211.9 |
| Pico Abrasion Index | 26 | 29 | 22 | 29 | 24 |
| Durometer Hardness, Type A | 92 | 91 | 81 | 90 | 90 |
| Example | 53* | 54* | 55* | 56* | 57* |
| Recipe | | | | | |
| Epon 828, Wt. Parts | 100 | 100 | 100 | 100 | 100 |
| ATBN, Wt. Parts | 300 | 300 | 300 | 300 | 300 |
| Bisphenol A, Wt. Parts | 24 | 24 | 24 | 24 | 24 |
| Test Data | | | | | |
| Wt. % Acrylonitrile in ATBN | 17 | 17.9 | 17.9 | 18.2 | 26.5 |
| Cure Cycle, ° C/Hrs | ** | 120/18 | ** | ** | ** |
| 100% Modulus, psi*** | 415 | 805 | 1020 | 786 | 612 |
| 100% Modulus, psi**** | 121 | 195 | 211 | 186 | 77 |
| 200% Modulus, psi*** | 656 | 1272 | — | 1488 | 957 |
| 200% Modulus, psi**** | 193 | — | — | — | 126 |
| Tensile Strength, psi*** | 1281 | 1485 | 1512 | 1463 | 1521 |
| Tensile Strength, psi**** | 240 | 261 | 301 | 225 | 165 |
| Ultimate Elongation, %*** | 338 | 230 | 190 | 198 | 301 |
| Ultimate Elongation, %**** | 250 | 150 | 160 | 117 | 257 |
| Gehman Freeze Pt., ° C | −54 | −61 | −59 | −60 | −45 |
| Compression Set, % | 35.2 | 42.8 | 59.7 | 23.5 | 64.9 |
| Tear Resistance, lbs/in. | 134.7 | 190.2 | 209.0 | 169.8 | 205.4 |
| Pico Abrasion Index | 24 | 21 | 23 | ***** | 19 |

TABLE VIII-continued

| Duromater Hardness, Type A | 80 | 92 | 94 | 89 | 90 |
| --- | --- | --- | --- | --- | --- |

*Tested using Die C dumbbell samples
**Two-stage cure cycle in which the sample was cured first for 2 hours at 120° C and thereafter for 2 hours at 150° C
***Tested at 25° C
****Tested at 80° C
*****Cut through sample

EXAMPLES 58-61

Examples 58-61 demonstrate the effects of a diprimary diamine chain extender in elastomeric compositions of this invention. The diamine was a reaction product of a dimer acid and a diamine sold under the trademark Kemamine DP-3680 by Humko-Sheffield Chemical. The diamine had minimum total and primary amine values of 175 and 165 respectively, with amine value being defined as the milligrams of potassium hydroxide equivalent to the amine alkalinity present in one gram of diamine sample. Test results are set forth in Table IX.

TABLE IX

| Example | 58* | 59* | 60* | 61* |
| --- | --- | --- | --- | --- |
| Recipe | | | | |
| Epon 828, Wt. Parts | 100 | 100 | 100 | 100 |
| ATB, Wt. Parts | 300 | 270 | 240 | 210 |
| Bisphenol A, Wt. Parts | 24 | 24 | 24 | 24 |
| Diamine | — | 30 | 60 | 90 |
| Test Data | | | | |
| Cure Cycle, ° C/Hrs. | 120/16.5 | ** | ** | ** |
| 100% Modulus, psi*** | 897 | 793 | 761 | 310 |
| 200% Modulus, psi*** | 1348 | — | — | — |
| Tensile Strength, psi*** | 1680 | 1239 | 1093 | 1176 |
| Ultimate Elongation, %*** | 249 | 188 | 143 | 351 |
| Gehman Freeze Pt. ° C | −80 | −84 | −87 | −16 |
| Compression Set, % | 28.6 | 22.5 | 30.7 | 70.0 |
| Tear Resistance, lbs/in. | 190.9 | 198.6 | 126.7 | 123.1 |
| Pico Abrasion Index | 26 | **** | **** | **** |
| Durometer Hardness, Type A | 92 | 94 | 93 | 86 |

*Tested using Die C dumbbell samples
**Two-stage cure cycle in which the sample was cured first for 2 hours at 120° C and thereafter for 2 hours at 150° C
***Tested at 25° C
****Cut through sample

EXAMPLES 62-64

Examples 62-64 demonstrate the utility of compositions of this invention in white tire sidewall paints having good to excellent flex crack resistance. Each sample was prepared by painting the convex side of a 1 in. × 6 in. × ¼ in. strip of cured rubber tire sidewall composition, followed by curing the painted strip for 15 minutes in a circulating air oven at 180° F. All paints cured during that time to tough, glossy, tack-free rubbers. Flex crack resistance was measured using a Demattia flexometer according to ASTM D-430. Flex resistance was tested both after the initial cure and after further aging for 5 days at 180° F. Adhesion was found to be excellent even though the sidewall had not been buffed before painting. Test results are reported in Table X.

TABLE X

| Example | 62 | 63 | 64 |
| --- | --- | --- | --- |
| Recipe | | | |
| Epon 812, Wt. Parts | 100 | 100 | 100 |
| ATBN, Wt. Parts | 500 | 625 | 833 |
| Bisphenol A, Wt. Parts | 25 | 25 | 25 |
| Titanium Dioxide, Wt. Parts | 500 | 625 | 833 |
| Kerosene, Wt. Parts | 500 | 625 | 833 |
| Test Data | | | |
| 100% Flex Failure of 3 Samples After Initial Cure, Cycles (1) | 10,000 | 10,000 | 1,500,000* |
| (2) | 13,000 | 15,000 | 1,400,000* |
| (3) | 1,000 | 20,000 | 1,500,000* |
| 100% Flex Failure of 3 Samples After Further 5 Day Cure at 180° F (19 | 15,000 | 17,000 | 60,000 |
| (2) | 24,000 | 35,000 | 60,000 |
| (3) | 30,000 | 385,000 | 1,500,000* |

*Test was stopped at this point even though no flex failure had occurred

EXAMPLES 65-66

Examples 65-66 demonstrate production of elastomeric compositions of this invention by curing a mixture of an amine-terminated liquid polymer and 1,4-butanediol diglycidyl ether, the latter having an epoxy equivalent weight of about 136 and a viscosity at 25° C. of about 19 cps. The latter material is sold under the trademark "Araldite RD-2" by Ciba Products Company. Test data is summarized in Table XI.

TABLE XI

| Example | 65* | 66* |
| --- | --- | --- |
| Recipe | | |
| Araldite Rd-2, Wt. Parts | 100 | 100 |
| ATBN, Wt. Parts | 200 | 300 |
| Test Data | | |
| Cure Cycle, ° C/Hrs. | 120/21 | 120/19 |
| 100% Modulus at 25° C, psi | — | — |
| 100% Modulus at 80° C, psi | — | — |
| Tensile Strength at 25° C, psi | 225 | 284 |
| Tensile Strength at 80° C, psi | 166 | 171 |
| Ultimate Elongation at 25° C, % | 60 | 116 |
| Ultimate Elongation at 80° C, % | 37 | 50 |
| Gehman Freeze Pt., ° C | −39 | −48.5 |
| Compression Set, % | 39.4 | 30.9 |
| Tear Resistance, lbs/in. | 37 | 31 |
| Pico Abrasion Index | ** | ** |
| Durometer Hardness, Type A | 64 | 58 |

*Tested using Die C dumbbell samples
**Cut through sample

The compositions of this invention are useful as castable elastomeric systems, in toughened structural plastics, in paints and coatings, in sealants and adhesives and the like. Toughened structural plastics made from compositions of this invention may be used in appliance housings, gears, electrical circuit boards and the like. Elastomeric systems made from compositions of this invention may be used in partial or total replacement of vulcanized synthetic or natural rubbers in farm tires, bladders, industrial hose, and the like. Paints such as tire sidewall paints and the like can also be made from the compositions of this invention.

I claim:
1. A process for forming a facing on a tire comprising
   (1) applying to the exterior surface of the tire a thin layer of a liquid coating material, said material comprising:
      (A) 100 parts by weight of a non-cycloaliphatic epoxy resin containing at least an average of about 1.7 oxirane groups per molecule, said resin having an epoxy equivalent weight from about 70 to about 6000, and

(B) from about 1 to about 1,000 parts by weight of an amine-terminated liquid polymer containing an average from about 1.7 to about 3 amine groups per molecule, said groups being primary, secondary or a mixture thereof, and said polymer having the formula

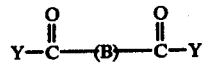

wherein Y is a univalent radical obtained by removing hydrogen from an amine group of an aliphatic, alicyclic, heterocyclic or aromatic amine containing from 2 to 20 carbon atoms and at least two amine groups, at least two of said amine groups being primary, secondary or a mixture thereof, and B is a polymeric backbone consisting of carbon-carbon linkages and containing polymerized units of at least one vinylidene monomer having at least one terminal $CH_2=C<$ group, said monomer being selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

said R being hydrogen or an alkyl radical containing 1 to 3 carbon atoms and said $R^1$ being hydrogen, an alkyl radical containing 1 to 18 carbon atoms, or an alkoxyalkyl, alkylthioalkyl or cyanoalkyl radical containing 2 to 12 carbon atoms, and (2) subjecting the tire surface to conditions sufficient to cure the layer of said coating material and adhere it to the tire.

2. A process of claim 1 wherein said monomer is selected from the group consisting of (a) monoolefins containing 2 to 8 carbon atoms, (b) dienes containing 4 to 8 carbon atoms, and (e) acrylic acids and acrylates having the formula

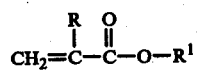

said R being hydrogen or an alkyl radical containing 1 to 3 carbon atoms and said $R^1$ being hydrogen, an alkyl radical containing 1 to 8 carbon atoms, or an alkoxyalkyl, alkylthioalkyl or cyanoalkyl radical containing 2 to 8 carbon atoms.

3. A process of claim 2 wherein said epoxy resin has an epoxy equivalent weight from about 70 to about 2,000.

4. A process of claim 3 wherein said epoxy resin is at least one glycidyl ether resin.

5. A process of claim 4 wherein said coating material contains at least one chain extender or crosslinker.

6. A process of claim 5 wherein said epoxy resin is selected from the group consisting of (1) alkanediol diglycidyl ethers having the formula

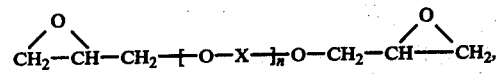

wherein X is an alkylene or alkylidene group containing from 1 to 10 carbon atoms, and n is from 1 to 25, (2) di- and polyglycidyl ethers of bisphenols, said bisphenols having the formula

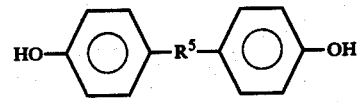

wherein $R^5$ is a bivalent radical containing from 1 to 8 atoms of at least one atom selected from the group consisting of C, O, S and N, and (3) alkanetriol triglycidyl ethers wherein the alkane group contains from 2 to 10 carbon atoms.

7. A process of claim 6 wherein said vinylidene monomer contains copolymerized therewith from 0% up to about 50% by weight of at least one comonomer selected from the group consisting of (f) vinyl aromatics having the formula

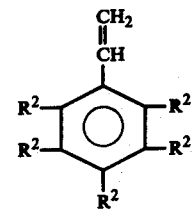

wherein $R^2$ is hydrogen, halogen or an alkyl radical containing from 1 to 4 carbon atoms, (g) vinyl nitriles having the formula

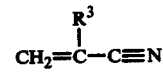

wherein $R^3$ is hydrogen or an alkyl radical containing 1 to 3 carbon atoms, (h) vinyl halides, (i) divinyls and diacrylates, (j) amides of $\alpha,\beta$-olefinically unsaturated carboxylic acids containing 2 to 8 carbon atoms, and (k) allyl alcohol.

8. A process of claim 7 wherein said amine groups have different reactivities, and said comonomer is selected from the group consisting of (f) said vinyl aromatics and (g) said vinyl nitriles.

9. A process of claim 8 wherein said chain extender is at least one dihydric aromatic compound containing from 6 to 24 carbon atoms.

10. A process of claim 9 wherein said dihydric aromatic compound is at least one of said bisphenols, said epoxy resin is a triglycidyl ether of glycerol, said amine is at least one N-(aminoalkyl)piperazine, the aminoalkyl group of said amine contains from 1 to 12 carbon atoms, said vinylidene monomer is at least one of said dienes, and said comonomer is at least one of said vinyl nitriles.

11. A process of claim 10 wherein said diene is butadiene and said vinyl nitrile is acrylonitrile.

12. A process of claim 11 wherein said amine is (N-2-aminoethyl)piperazine, and said chain extender is isopropylidene bisphenol.

* * * * *